(12) United States Patent
Kinard et al.

(10) Patent No.: US 6,540,900 B1
(45) Date of Patent: Apr. 1, 2003

(54) METHOD OF ANODIZING ALUMINUM CAPACITOR FOIL FOR USE IN LOW VOLTAGE, SURFACE MOUNT CAPACITORS

(75) Inventors: John Tony Kinard, Greer, SC (US); Brian John Melody, Greer, SC (US); Philip Michael Lessner, Simpsonville, SC (US); Albert Kennedy Harrington, Fountain Inn, SC (US); David Alexander Wheeler, Williamston, SC (US); Erik Karlsen Reed, Mauldin, SC (US); Duane Earl Stenziner, Simpsonville, SC (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

(21) Appl. No.: 09/977,244

(22) Filed: Oct. 16, 2001

(51) Int. Cl.[7] .............................................. C25D 11/12
(52) U.S. Cl. ...................... 205/153; 205/175; 205/224; 205/229; 205/332
(58) Field of Search ................................ 205/139, 153, 205/175, 224, 229, 332

(56) References Cited

U.S. PATENT DOCUMENTS

| | | | |
|---|---|---|---|
| 1,906,691 A | 5/1933 | Lilienfeld | |
| 3,796,644 A | 3/1974 | Bernard et al. | |
| 4,093,972 A | 6/1978 | Voyles | |
| 4,146,439 A | 3/1979 | Randall, Jr. | |
| 4,203,194 A | 5/1980 | McGrath | |
| 4,288,842 A | 9/1981 | Voyles | |
| 4,606,975 A | 8/1986 | Mohr | |
| 5,158,663 A | * 10/1992 | Yahalom | ..................... 205/50 |
| 5,674,371 A | 10/1997 | Patel | |
| 5,935,408 A | 8/1999 | Kinard et al. | |
| 6,149,793 A | 11/2000 | Melody et al. | |
| 6,409,905 B1 | * 6/2002 | Melody et al. | ............. 205/234 |
| 6,459,565 B1 | * 10/2002 | Lessner et al. | ............. 361/508 |

OTHER PUBLICATIONS

Paul Knight Deeley, "Electrolytic Capacitors", The Theory, Construction, Characteristics and Application of All Types, Chapt IX., pp. 106–118, 1938.

* cited by examiner

Primary Examiner—Nam Nguyen
Assistant Examiner—William T. Leader
(74) Attorney, Agent, or Firm—Banner & Witcoff, Ltd.

(57) ABSTRACT

Disclosed is a process for the continuous anodizing of aluminum foil for use in aluminum electrolytic capacitors. Specifically, etched anode foil is anodized to relatively low voltage in a two-step reel-to-reel process. The process is particularly useful for anodizing highly-etched aluminum foil for use in surface mount aluminum capacitors containing conductive polymer cathode material. The process is economical and provides high foil quality. Specifically, the process for anodizing aluminum foil comprises anodizing the foil in a first electrolyte a solution, passing the foil through an oven, anodizing the foil in a second anodizing solution wherein the first electrolyte solution and second electrolyte solution each comprise about 5 wt % to about 50 wt % glycerine, about 0.01 wt % to about 0.2 wt % ammonium phosphate, and de-ionized water, and wherein the foil is anodized in the first electrolyte solution for at least 3.5 minutes

12 Claims, No Drawings

METHOD OF ANODIZING ALUMINUM CAPACITOR FOIL FOR USE IN LOW VOLTAGE, SURFACE MOUNT CAPACITORS

FIELD OF THE INVENTION

The invention relates to a method of anodizing aluminum capacitor foil.

BACKGROUND OF THE INVENTION

So-called "solid" tantalum capacitors which employ pyrolytically deposited manganese dioxide as the cathode material readily lend themselves to surface mount applications and have become the device of choice for circuit designers desiring the maximum capacitance in a given case size, high reliability, and high resistance to the temperatures associated with the reflow soldering techniques used to attach surface mount components to circuit boards. Aluminum electrolytic capacitors containing a liquid electrolyte may be fabricated with a base which facilitates surface mounting under carefully controlled solder reflow conditions, but these devices lack the resistance to high solder reflow temperatures and the parametric stability over a broad temperature range characteristic of their tantalum surface mount counterparts.

In recent years, tantalum and aluminum capacitors containing intrinsically conductive polymer cathode materials, such as polypyrole, polyaniline, polythiophene, and derivatives thereof, have been introduced commercially. The high electrical conductivity and thermal stability of certain of these intrinsically conductive polymers makes them almost ideally suitable for use as cathode materials for surface mount electrolytic capacitors. The introduction of these materials has led to a reduction in device ESR and reduced ignition damage from shorted capacitors as well as to the introduction of truly surface mountable aluminum electrolytic capacitors.

Unfortunately, aluminum electrolytic capacitors which contain intrinsically conductive polymer cathode materials, and which are not hermetically sealed against contact with the atmosphere, tend to undergo degradation of their leakage current performance with time, particularly when exposed to a humid environment. The tendency for the leakage current of conductive polymer containing, surface mount aluminum capacitors to increase with time has been traced in large part to the tendency of the anodic aluminum oxide to react with the humidity in the atmosphere to form hydrated aluminum oxide which is known to have very poor properties as an insulating dielectric film. In "wet" aluminum capacitors, which contain organic liquid electrolyte solutions, hydration degradation of the aluminum oxide film is minimized by limiting the water content of the electrolyte solution and by including a small amount of orthophosphate ion in the electrolyte composition. Orthophosphate, adsorbed on the anodic oxide surfaces, acts as a barrier layer, which inhibits the hydration reaction.

In surface mount devices containing conductive polymer cathode materials, the moisture of the atmosphere has ready access to the anodic oxide film due to the absence of a hermetic seal and the relatively porous nature of the usual conductive polymer cathode materials. Destructive hydration of the anodic oxide in polymer cathode aluminum capacitors is inhibited by the presence of an adsorbed layer of phosphate applied after the anodizing step(s) and prior to the application polymer cathode material. Unfortunately, the relatively thin coating of phosphate adsorbed on the outer surface of the anodic oxide is easily damaged during assembly of the capacitors. Any break or crack in the outer phosphate layer allows atmospheric moisture access to the reactive anodic oxide film and generally results in hydration damage and increased device leakage current.

Provisional Patent Application Serial No. 60/296,725 and co-pending U.S. application Ser. No. 09/891,208, now Pat. No. 6,450,565, describe the large hydration stability advantage obtained through the use of aluminum capacitor anode foil which has been anodized in a phosphate solution rather than in the dicarboxylic acid salt solutions normally used to anodize low voltage, high surface area capacitor foil. As described in this application, aluminum foil, which has been anodized in a phosphate solution has been found to be extremely resistant to hydration degradation even if the anodic oxide coating is cracked or damaged during the assembly of the finished capacitors.

Unfortunately, aqueous solutions containing orthophosphate as the sole anionic species tend to have a solvent action upon the aluminum foil during anodizing; this aluminum dissolution occurs even at near-neutral pH. The dissolved aluminum tends to form an aluminum phosphate precipitate which rapidly clouds the anodizing solution and which precipitates upon the anodizing tank surfaces as well as upon the foil being anodized. With the aluminum foil used for "phase shifting" or "motor start" capacitors, which has relatively shallow, wide diameter etch tunnels, the above described precipitation of aluminum phosphate upon the surface of the foil being anodized in a phosphate solution is of little consequence and aqueous, phosphate-based anodizing electrolyte solutions were used to anodize this type of foil for many years. With modern, highly etched aluminum anode foils having deep, closely packed, narrow diameter etch tunnels, aqueous phosphate anodizing tends to be even more corrosive towards the foil; the fine etch tunnel structure of modern aluminum capacitor foils may be partially or completely destroyed or blocked by precipitates during aqueous phosphate anodizing. Thus, modern, high surface area anode foil is not anodized in phosphate-containing electrolyte solutions.

In co-pending application Ser. No. 09/709,742, now Pat. No. 6,409,905, the use of glycerine-containing phosphate solutions for anodizing aluminum capacitor foils are described. Aluminum dissolution during anodizing may be reduced or eliminated through the use of glycerine-containing phosphate solutions rather than the use of aqueous phosphate solutions containing no glycerine. The nearly complete absence of aluminum dissolution in phosphate solutions containing an appropriate amount of glycerine facilitates the use of these solutions for the anodizing of modern, highly-etched foils. The hydration resistance advantages obtained with surface mount aluminum electrolytic capacitors, containing conductive polymer cathode materials and phosphate-anodized anode foil, have already been described.

BRIEF SUMMARY OF THE INVENTION

The invention is directed to a process for anodizing aluminum foil comprising anodizing the foil in a first aqueous electrolyte solution, heating the foil in an oven, and anodizing the foil in a second anodizing solution, wherein the first aqueous electrolyte solution and second aqueous electrolyte solution each comprise about 5 wt % to about 50 wt % glycerine, about 0.01 wt % to about 0.2 wt % ammonium phosphate, and water, and wherein the foil is anodized in the first aqueous electrolyte solution for at least about 3.5 minutes. Preferably, the water is de-ionized.

In a preferred embodiment, the first and second aqueous electrolyte solutions each comprise about 5 wt % to about 25 wt % glycerine. In another preferred embodiment, about 0.1% ammonium phosphate is present in the first and/or second aqueous electrolytic solutions.

In a further preferred embodiment, the temperature of the first aqueous electrolyte solution and second aqueous electrolyte solution are each between about 80° C. and 90° C.

DETAILED DESCRIPTION OF THE INVENTION

The present invention is directed to a process for the continuous anodizing of aluminum foil for use in aluminum electrolytic capacitors. Specifically, etched anode foil is anodized to relatively low voltage in a two-step reel-to-reel process. The present invention is particularly useful for anodizing highly-etched aluminum foil for use in surface mount aluminum capacitors containing conductive polymer cathode material. The process of the invention is economical and provides high foil quality.

The process of continuous anodizing of aluminum foil via passing the foil through tanks containing anodizing electrolyte solution in a "reel-to-reel" process has been known for many years and is described in Paul M Deeley, *Electrolytic Capacitors* Comell-Dubilier Electric Corporation, South Planefield, N.J., 1938, pp 105–118. The main improvement since Deeley was published is the use of near-neutral pH solutions of the ammonium salts of dicarboxylic acids such as ammonium adipate in place of the boric acid/borax solutions employed in the 1930's. Carboxylic acid salt solutions result in very high anodizing efficiency with minimal aluminum dissolution and are well suited to the anodizing of high surface area (i.e., highly etched) aluminum foil.

It was discovered that a process similar to Deeley's reel-to-reel anodizing process can be used to anodize highly tunnel-etched aluminum foil to produce a highly hydration-resistant oxide film on the aluminum. This process utilizes a phosphate ionogen electrolyte solution containing glycerine ("glycerol"), which inhibits the aluminum dissolution reaction. This electrolytic solution is described in co-pending Application Ser. No. 09/709,742, which is hereby incorporated by reference in its entirety.

It was further discovered that the residence time which the foil spends exposed to voltage has a direct influence upon the quality of the oxide produced from a leakage current standpoint. There is a rapid improvement in leakage current between a residence time at voltage before heat-treatment of 1 minute and 4 minutes. The leakage current performance of the foil improves above a residence time at voltage of 4 minutes, but much more slowly than before a residence time of about 4 minutes is reached.

The process of the invention may use multiple anodizing tanks, such as are depicted schematically on page 111 of Deeley, or one large anodizing tank. The foil may pass through a suitable oven, such as a tunnel oven, between anodizing tanks, approximately halfway through the anodizing process. The foil is heat treated in the oven.

In accordance with one embodiment of the invention, the foil is immersed in the aqueous electrolyte solution and anodized (first anodizing step), then the foil is passed through the oven (heat treatment step), and then the foil is immersed in a second aqueous electrolyte solution (second anodizing step).

The aqueous electrolyte solution has a relatively low concentration of glycerine, e.g., about 5 wt % to about 50 wt %, preferably about 5 wt % to about 25 wt %, more preferably about 10 wt % to about 20 wt % glycerine, in water containing a relatively low amount, e.g., about 0.01 wt % to about 0.2 wt %, preferably about 0.1 wt %, of ammonium phosphate. Preferably, the water is de-ionized. The temperature of the solution is maintained between about 80° C. and 90° C.

The residence time of the foil in the aqueous electrolyte during the 1st anodizing step is at least 3.5 minutes, preferably at least about 4 minutes, more preferably between about 4 minutes and 60 minutes. Typically 15 minutes provides the desired anodization results.

The applied voltage is typically about 4 to about 100, typically about 4 to about 50.

A rinse step, typically with water, may be employed between the first anodizing step and the heat-treatment step. A rinse step is likely unnecessary due to the nearly complete evaporation of the aqueous glycerine/ammonium phosphate solution from the foil as the foil is heated in the in-line tunnel oven.

The temperature of the oven is typically between about 300° C. and about 550° C., preferably between about 350° C. and about 500° C., and most preferably between about 400° C. and about 450° C. Preferably, sufficient air should flow through the oven to prevent build-up of electrolyte decomposition products on the internal surfaces of the oven during use. Typically the residence time is about 5 seconds to about 5 minutes.

The foil is then anodized at least one more time at approximately the same voltage, electrolyte composition, and temperature as used in the first anodizing step, although the electrolyte may contain a lower concentration of ammonium phosphate and exhibit a higher resistivity if desired in order to facilitate drying at a lower temperature.

The foil may then be dried with room temperature or heated air, by passing through a tunnel oven or any other suitable oven. Other gases, such as nitrogen, argon, oxygen, or carbon dioxide, could be used in place of air. The foil may be rinsed before final drying, but this is not necessary if sufficiently vigorous drying methods are employed. The anodized foil may then be wound onto a take-up reel in preparation for further processing into surface mount capacitors.

The effects of both the heat-treatment and residence time at voltage prior to heat-treatment are illustrated in the following example.

EXAMPLE 1

Commercially available etched, unanodized, aluminum foil having a thickness of 100 microns and having a surface area sufficient to have a capacitance×voltage (CV) product of about 1,330 microfarad-volts/cm$^2$ was slit to a width of 3 mm. Slitting facilitates assembly into surface mount capacitors via cutting foil coupons from the roll of anodized foil. The foil coupons are then welded to support bars. The support bars are held in a frame for further processing.

A spool of this foil was mounted on a reel-to-reel anodizing machine, such as depicted in Deeley. The foil anodizing machine has a drive apparatus for pulling the foil through an initial anodizing bath, then through a tunnel oven employing a hot air blast, then through a second anodizing tank, and finally through an air blast (room temperature) to dry the foil prior to take-up on the collection spool or reel.

The speed of traverse of the foil was varied to provide different residence times in the initial anodizing bath. The tunnel oven was employed for all but control tests and was maintained at a temperature of approximately 425° C. The residence time in the second anodizing tank was ⅔ of the residence time in the initial anodizing tank.

The anodizing electrolyte solution used in both the initial and the second anodizing tank was an aqueous solution of 10 vol. % glycerine and 0.1 wt. % mono-basic ammonium phosphate at 80° C. to 90° C. Elimination of the glycerine from the above anodizing solution resulted in aluminum/aluminum oxide dissolution and precipitation of aluminum phosphate compounds on the tank interior and on the foil. The presence of the glycerine in the solution appears to almost completely inhibit aluminum dissolution and aluminum salt precipitation.

The anodized foil was then cut into small coupons used to make surface mount capacitors and these coupons were welded to process bars for further processing. The coupons were heat-treated at 400° C. for 10 minutes and then were subjected to an edge anodizing step to the original anodizing voltage and in the original anodizing electrolyte solution composition, but at 50° C., in order to form anodic on the cut edges of the foil. The coupons were then subjected to a 30 minute heat-treatment at 300° C. and were again subjected to another 50° C. edge anodizing step in the original solution composition. The results are given in Table 1.

TABLE 1

|  | Test 1 | Test 2 | Test 3 | Test 4 | Test 5 |
| --- | --- | --- | --- | --- | --- |
| Anodizing Voltage | 13 volts | 13 volts | 5 volts | 5 volts | 5 volts |
| Residence Time in 1st Anodizing Tank | 30 min | 4 min | 30 min | 4 min | 1 min |
| Post 1st Anodizing & Heat-treatment | none | 425° C. | 425° C. | 425° C. | 425° C. |
| End Current 1st Edge Anodizing Step, 30 min. (per element) μA | 2.96 | 0.81 | 0.57 | 0.75 | 165.5 |
| End Current 2nd Edge Anodizing Step, 30 min. (per element) μA | 0.053 | 0.050 | 0.047 | 0.050 | N/A |

The data for the foil anodized to 5 volts indicates that no significant advantage is obtained by increasing the 1st anodizing residence time to 30 minutes from 4 minutes, as is indicated by the end currents after the 1st and 2nd edge anodizing steps. The high end current observed after the 1st edge anodizing step for the foil with the 1 minute residence time in the first anodizing step indicates that 1 minute is insufficient and that much better results are obtained with a residence time of 4 minutes or more.

The benefit of a heat-treatment step following the 1st anodizing step is observed in the reduced end current at the 1st edge anodizing step for the 13 volt foil which was heat-treated after the 1st anodizing step versus the foil which was not heat-treated after the 1st anodizing step.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A process for anodizing aluminum foil comprising anodizing the foil in a first aqueous electrolyte solution, heating the foil in an oven, anodizing the foil in a second aqueous anodizing solution wherein the first aqueous electrolyte solution and second aqueous electrolyte solution each comprise about 5 wt % to about 50 wt % glycerine, about 0.01 wt % to about 0.2 wt % ammonium phosphate, and water, and wherein the foil is anodized in the first aqueous electrolyte solution for at least 3.5 minutes.

2. The process of claim 1 wherein the first aqueous electrolyte solution comprises about 5 wt % to about 25 wt % glycerine.

3. The process of claim 1 wherein the first aqueous electrolyte solution comprises about 10 wt % to about 20 wt % glycerine.

4. The process of claim 1 wherein the second aqueous electrolyte solution comprises about 5 wt % to about 25 wt % glycerine.

5. The process of claim 1 wherein the temperature of the first aqueous electrolyte solution and second aqueous electrolyte solution are each between about 80° C. and 90° C.

6. The process of claim 1 wherein the foil is anodized in the first aqueous electrolyte solution for about 4 minutes to about 60 minutes.

7. The process of claim 1 wherein the temperature of the oven is between about 300° C. and about 550° C.

8. The process of claim 7 wherein the temperature of the oven is between about 350° C. and about 500° C.

9. The process of claim 8 wherein the temperature of the oven is between about 400° C. and about 450° C.

10. The process of claim 1 further comprising blowing air through the oven sufficient to prevent build-up of electrolyte decomposition products.

11. The process of claim 1 further comprising drying the foil after removing from the second electrolyte solution.

12. The process of claim 1 wherein the water is de-ionized water.

* * * * *

UNITED STATES PATENT AND TRADEMARK OFFICE
CERTIFICATE OF CORRECTION

PATENT NO. : 6,540,900 B1
DATED : April 1, 2003
INVENTOR(S) : John Tony Kinard et al.

It is certified that error appears in the above-identified patent and that said Letters Patent is hereby corrected as shown below:

Title page,
Item [75], Inventors, "Stenziner" has been replaced with -- Stenzinger --.
Item [57], ABSTRACT,
Line 10, "a solution" has been replaced with -- solution --.

Column 3,
Line 25, "Comell-Dubilier" has been replaced with -- Cornell-Dubilier --.

Signed and Sealed this

Twenty-sixth Day of August, 2003

JAMES E. ROGAN
*Director of the United States Patent and Trademark Office*